Figure 1:
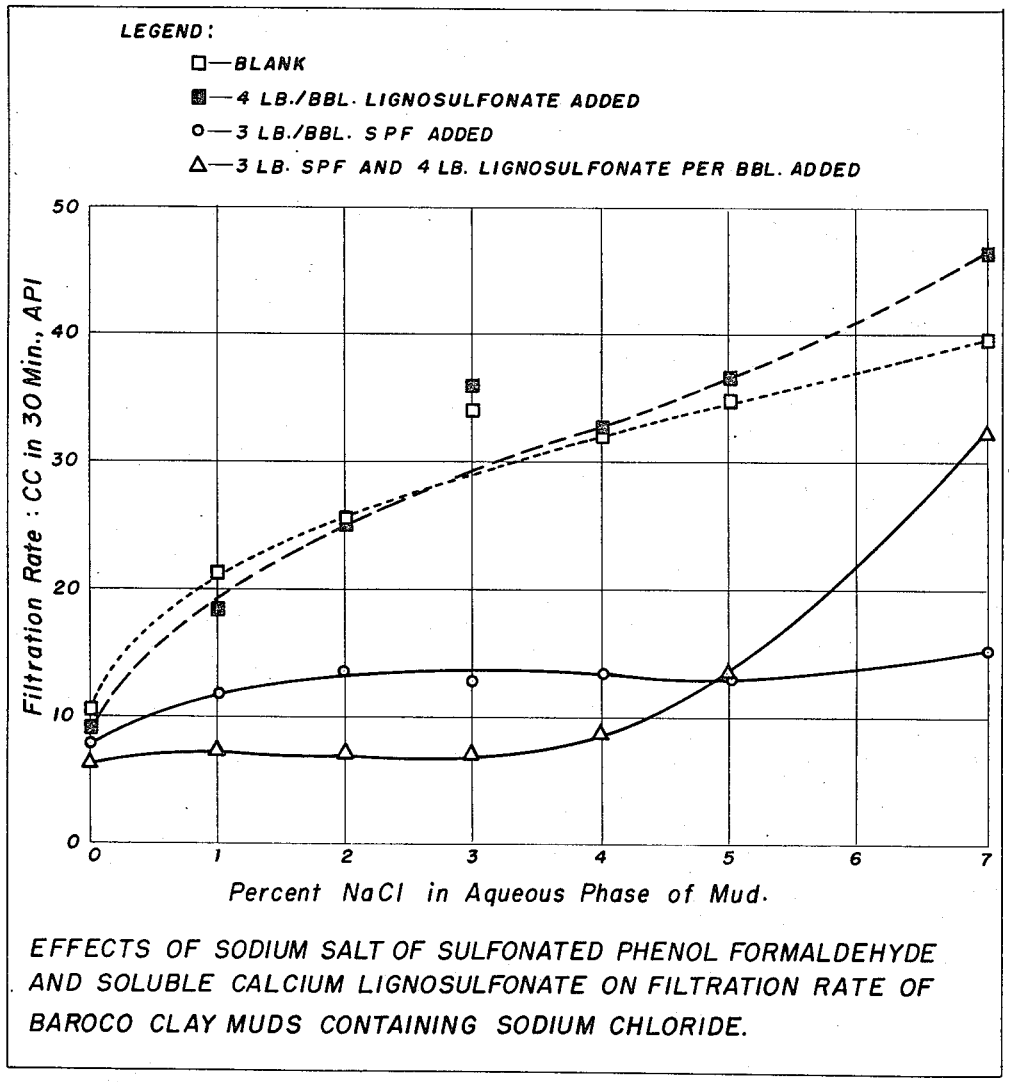

EFFECTS OF SODIUM SALT OF SULFONATED PHENOL FORMALDEHYDE AND SOLUBLE CALCIUM LIGNOSULFONATE ON FILTRATION RATE OF BAROCO CLAY MUDS CONTAINING CALCIUM CHLORIDE

Patented Aug. 18, 1953

2,649,414

UNITED STATES PATENT OFFICE 2,649,414

DRILLING MUD

Richard A. Salathiel, Houston, Tex., assignor, by mesne assignments, to Standard Oil Development Company, Elizabeth, N. J., a corporation of Delaware Application April 19, 1952, Serial No. 283,159

10 Claims. (Cl. 252—8.5)

The present invention is directed to a suspension of finely divided solids in an aqueous medium for use in well drilling operations. More particularly, the invention is directed to a drilling mud having a low filtration rate. In its more specific aspects, the invention is directed to a drilling mud to which has been added synergistic amounts of filtration reducing materials.

The present invention may be briefly described as involving a drilling mud comprising at least 5% by weight of finely divided solids in water to which has been added or which contains a water soluble salt of lignin sulfonic acid in an amount in the range between 0.5 and 20 pounds per 42 gallon barrel of the mud and a water soluble salt of a sulfonated phenol-formaldehyde condensation product in an amount in the range between 0.5 and 10 pounds per 42 gallon barrel of the mud.

The present invention also involves a method for treating a suspension of finely divided solid materials in an aqueous liquid vehicle which comprises adding to the suspension an amount of a water soluble salt of lignin sulfonic acid in the range between 0.5 and 20 pounds per 42 gallon barrel of the suspension and a water soluble salt of a phenol-formaldehyde condensation product in an amount in the range between 0.5 and 10 pounds per 42 gallon barrel of the suspension, the addition of the two salts in the amount stated resulting in a lowering of the filtration rate of the suspension to an extent greater than the combined lowering effect of the two salts added singly to the suspension.

The present invention also encompasses a method of forming a filter cake having a low rate of filtration on the wall of a well bore produced by a well drilling process in which drilling mud is circulated downwardly and then upwardly in the well bore, which comprises admixing with the drilling mud an amount in the range between 0.5 and 20 pounds per 42 gallon barrel of the mud of a water soluble salt of lignin sulfonic acid and an amount in the range between 0.5 and 10 pounds per 42 gallon barrel of the mud of the water soluble salt of a sulfonated phenol-formaldehyde condensation product. The addition of these two salts in the amounts stated exerts a synergistic effect on the filtration rate of the drilling mud such that the water loss from the drilling mud to permeable formations is reduced to an extent greater than the combined effects of the salts added singly to the drilling mud.

In the practice of the present invention it is desirable to use an aqueous medium as a base for the drilling mud. The aqueous medium may be fresh water, such as obtained from wells or streams or it may be saline water from wells or the sea. Likewise, the water which may be employed as the water base for the suspension or drilling mud may be water to which has been added alkali metal chlorides and/or alkaline earth metal chlorides. For example, it may be desirable in the practice of my invention to provide in the water employed in drilling operations a sufficient amount of chlorides to enhance the beneficial aspects of my improved composition and method. I may, therefore, adjust the salinity of the water employed in making up an aqueous drilling mud. For example, I have found that it is desirable to employ drilling muds in accordance with my invention made up from waters having salinities of from 0.5% to 4.5% by weight. When the total salinity of the water employed in my invention is due to alkali metal chloride the salinity should not be greater than 4.5% NaCl. When the salinity is due to an alkaline earth metal chloride the salinity should not be greater than 2%. Actually, I prefer to employ waters having salinities in the range from about 0.5% to 4.5%. Sea water, which averages about 3.5% total salinity, is in the preferred range.

It is contemplated that the drilling muds in accordance with my invention may contan other additives besides the water soluble salts of lignin sulfonic acid and the water soluble salts of a sulfonated phenol-formaldehyde condensation product. I contemplate that the drilling mud in accordance with the present invention may contain materials such as caustic, quebracho, lime, cement, gypsum, anhydrite, and the like. Some of these materials may be added to the drilling mud at the surface; others may be encountered in subsurface formations during drilling operations.

The finely divided solid material employed in the practice of the present invention will ordinarily include clay, such as colloidal clay bodies. For example, I may use in my drilling mud or aqueous suspension colloidal clays, such as Wyoming bentonite, El Paso surface clay, medium-yield drilling clays from Texas, clays containing the montmorillonites and especially sodium montmorillonite. The calcium montmorillonite clays may be employed and clays containing other suitable cationic combinations of the montmorillonites may be used. Sodium montmorillonite such as that encountered in Wyoming bentonite is included in the preferred type of clay. Clays falling within the purview of my invention are described in the Carman Patent 1,460,788, and the Harth Patent 1,991,637. I also contemplate that I may use in the practice of my invention muds such as those produced when clayey subsurface formations are drilled. For example, mud obtained from a drilling well in Lake Raccourci in Louisiana was found entirely suitable. Likewise, I may employ in my invention dried ground shale such as has been obtained from a well in West Cote Blanche Bay in southern Louisiana. To a suitable suspension of colloidal clay of the type exemplified is added an amount in the range given of a water soluble salt of a lignin sulfonic acid and a water soluble salt of a phenol-formaldehyde condensation product to produce my composition. The amount of clay or solids used may range from about 5% by weight of the mud up to as high as 75% by weight.

The water soluble salts of lignin sulfonic acid are the compounds such as described in the Mark Patent 2,141,570, and especially as set out by Mark supra on page 2 of his specification where the derivatives of lignin are described. The water soluble salts of a lignin sulfonic acid have been described by Howard in his Reissue Patent No. 18,268, December 1, 1931, and also in "Industrial and Engineering Chemistry," vol. 31, November 11, 1939, pages 1331–1335. A description of the water soluble salts of lignin sulfonic acids and a source thereof may also be found in the patent to Barnes 2,491,436.

The water soluble salts of a phenol-formaldehyde condensation product and a method of preparing same will be found in U. S. patent application, Serial No. 209,510, filed February 5, 1951, in the name of Richard A. Salathiel. Briefly the water soluble salts of the phenol-formaldehyde condensation product may be formed as follows:

Phenol is employed as the starting material and it is reacted with a slight molar excess of sulfuric acid at 100° C. for a time sufficient to convert a portion of the phenol to mono-sulfonated phenol. In practice, I have found it desirable to employ a sulfuric acid-to-phenol mol ratio in the range from 1.15 to 1.5, the mixture being reacted at 100° C. for about ½ hour in a closed vessel. On completion of the sulfonation reaction, the mixture is cooled to a temperature of 85° C. and dilute formaldehyde is added thereto with vigorous stirring as rapidly as the reaction heat can be dissipated from the reaction mixture without increasing the temperature thereof until about 0.75 to 0.85 mol of formaldehyde per mol of phenol has been added. The temperature of the reaction mixture is then raised to 95° C. and the remainder of the formaldehyde required to give a reaction mixture of the desired viscosity is added incrementally in small portions. The viscosity of the reaction mixture is continuously observed during the incremental addition of formaldehyde to prevent the reaction from proceeding so far as to produce water-insoluble products. When the reaction mixture has reached the desired viscosity a small amount of phenol is added thereto to stop the reaction. The reaction mixture, after the reaction is terminated, is cooled and neutralized with a suitable neutralizing agent such, for example, as an alkali metal hydroxide.

A specific mode of preparing the water soluble salts of the phenol-formaldehyde condensation product is as follows:

In a 3-neck flask fitted with a stirrer and a thermometer 75 grams of phenol were heated at 100° C. for ½ hour with 100 grams of concentrated sulfuric acid. A solution in 152 cc. water of 50 cc. (53.4 grams) of USP formaldehyde (about 37.1% by weight of formaldehyde) was added dropwise (the addition requiring ½ hour) while maintaining the temperature at 85° C. Then 100 cc. more water was added and the mixture held at 95° C. for 40 minutes. The viscosity of the hot reaction mixture reached 3.5 C. P. S. and then would go no higher. Two cc. more formaldehyde was added and heating continued (at 95° C.) for 105 minutes. The viscosity reached 8.5 C. P. S. and then failed to go higher. Then 1.3 cc. more formaldehyde was added and heating continued for 40 minutes. Viscosity reached 16.5 C. P. S. and increased no more. Addition of 0.6 cc. more formaldehyde and heating for an hour increased the viscosity to a stable value of about 38 C. P. S. Adding 0.2 cc. more formaldehyde and heating for 50 minutes increased the viscosity to 75 C. P. S. Then 0.2 cc. more formaldehyde was added (total added 54.3 cc.). This caused the viscosity to increase rapidly. It reached 150 C. P. S. in 12 minutes and obviously would have gone much higher. The reaction was stopped at this time by adding a solution of 5 grams phenol and 2 grams water. The viscosity of the hot reaction mixture dropped to a stable value of 135 C. P. S. (It would have been better to use a smaller amount of phenol to stop this reaction because excess phenol induces some foaming in drilling muds treated with the material.) The acidic solution was neutralized to a phenolphthalein end point by adding 120 cc. of 40% caustic soda solution. The neutralized solution after dilution to 725 grams by addition of water had a viscosity at 26° C. of 122 C. P. S.

In order to illustrate the invention further a number of compositions in accordance with the present invention were formed in which various types of clays were mixed with tap water, diluted sea water, undiluted sea water, and with water containing varying concentrations of sodium chloride and varying concentrations of calcium chloride. To these several compositions were added varying amounts of a water soluble salt, specifically the sodium salt of sulfonated phenol-formaldehyde condensation product, such as described supra and varying amounts of calcium lignin sulfonate, such as has been described before. In some instances the sodium salt of sulfonated phenol-formaldehyde condensation product was omitted from the composition and in other instances the calcium lignin sulfonate was omitted from the composition to show the difference in effect of adding the two materials separately and together to my improved mud composition.

The data in the following Table I present the composition and inspection characteristics of 18 different compositions which illustrate the practice of the present invention.

TABLE I

| Example No. | Composition of Mud | Amount of Sodium Salt of Sulfonated Phenol Formaldehyde Condensation Product Added, Lb./Bbl. | Amount of Lignosulfonate [1] added, Lbs./Bbl. | Filtration Rate, cc. in 30 Min. API |
|---|---|---|---|---|
| 1 | 1.6% Aquagel Clay [2]<br>18.0% Xact Clay [3]<br>80.4% Tap Water | 0<br>3<br>0<br>3 | 0<br>0<br>4<br>4 | 10.0<br>6.9<br>9.4<br>5.9 |
| 2 | 16.0% Baroco Clay [3]<br>84.0% Tap Water | 0<br>3<br>0<br>3 | 0<br>0<br>4<br>4 | 10.3<br>7.7<br>8.7<br>6.1 |
| 3 | Untreated Mud from Drilling Well (Lake Raccourci) Shale and Bentonite in diluted Sea-Water (½ Sea-Water Salinity). | 0<br>3<br>0<br>3 | 0<br>0<br>4<br>4 | 55.2<br>30.0<br>48.0<br>5.5 |
| 4 | 5% Aquagel Clay<br>30% Air-Dried and Ground Shale [4]<br>65% Sea Water (Synthetic) | 0<br>3<br>0<br>3 | 0<br>0<br>4<br>4 | 47.0<br>16.3<br>44.0<br>5.7 |
| 5 | 33% Air-Dried and Ground Shale<br>67% Sea Water (Galveston West Beach) | 0<br>3<br>0<br>3 | 0<br>0<br>4<br>4 | 55.5<br>18.0<br>------<br>6.4 |
| 6 | 24% Baroco Clay<br>76% Sea-Water | 0<br>3<br>0<br>3 | 0<br>0<br>4<br>4 | 31.2<br>11.6<br>31.9<br>8.5 |
| 7 | 20% Baroco Clay<br>80% 1% NaCl Solution | 0<br>3<br>0<br>3 | 0<br>0<br>4<br>4 | 21.1<br>11.6<br>18.3<br>7.1 |
| 8 | 22% Baroco Clay<br>78% 2% NaCl Solution | 0<br>3<br>0<br>3 | 0<br>0<br>4<br>4 | 25.4<br>13.3<br>25.2<br>6.9 |
| 9 | 23% Baroco Clay<br>77% 3% NaCl Solution | 0<br>3<br>0<br>3 | 0<br>0<br>4<br>4 | 34.0<br>12.7<br>35.9<br>6.9 |
| 10 | 5% Aquagel Clay<br>15% Baroco Clay<br>80% 3% NaCl Solution | 0<br>3<br>0<br>3 | 0<br>0<br>4<br>4 | 36.6<br>15.5<br>36.2<br>8.2 |
| 11 | 5% Aquagel Clay<br>30% Air-Dried and Ground Shale<br>65% 3% NaCl Solution | 0<br>3<br>0<br>3 | 0<br>0<br>4<br>4 | 35.4<br>19.2<br>30.4<br>5.4 |
| 12 | 24% Baroco Clay<br>76% 4% NaCl Solution | 0<br>3<br>0<br>3 | 0<br>0<br>4<br>4 | 31.9<br>13.2<br>32.6<br>8.5 |
| 13 | 25% Baroco Clay<br>75% 5% NaCl Solution | 0<br>3<br>0<br>3 | 0<br>0<br>4<br>4 | 34.8<br>12.7<br>36.6<br>13.3 |
| 14 | 25% Baroco Clay<br>75% 7% NaCl Solution | 0<br>3<br>0<br>3 | 0<br>0<br>4<br>4 | 39.3<br>15.0<br>46.2<br>32.2 |
| 15 | 23% Baroco Clay<br>77% 1% CaCl$_2$ Solution | 0<br>3<br>0<br>3 | 0<br>0<br>4<br>4 | 46.1<br>14.3<br>51.6<br>8.0 |
| 16 | 22.6% Baroco Clay<br>77.4% 2% CaCl$_2$ Solution | 0<br>3<br>0<br>3 | 0<br>0<br>4<br>4 | 50.9<br>18.5<br>56.3<br>16.7 |
| 17 | 22.3% Baroco Clay<br>77.7% 3% CaCl$_2$ Solution | 0<br>3<br>0<br>3 | 0<br>0<br>4<br>4 | 51.6<br>18.6<br>60.3<br>37.3 |
| 18 | 22% Baroco Clay<br>78% 4% CaCl$_2$ Solution | 0<br>3<br>0<br>3 | 0<br>0<br>4<br>4 | 51.3<br>15.8<br>63.1<br>47.4 |

[1] The soluble calcium lignosulfonate is "Kembreak" sold by the Milwhite Co.
[2] Aquagel Clay is a Wyoming bentonite.
[3] Baroco Clay and Xact Clay are commercial medium-yield drilling clays mined in Texas.
[4] The air-dried and ground shale was taken from 4,800 ft. in the West Cote Blanche Bay No. 2 well (Lake Sand Field, Louisiana).

For simplicity, the water soluble salts of the sulfonated phenol-formaldehyde condensation product, specifically the sodium salts, are referred to as SPF, in the following tables, and this terminology will be used throughout the specification for purposes of simplifying the description.

It will be noted from an examination of the data from Table I that a synergistic effect is obtained by using the SPF and the water soluble salt of lignin sulfonic acid together with respect to filtration rate. Although beneficial effects are obtained in fresh water muds as seen from the data, the results are more striking in salt water muds. It is to be observed, however, that the synergistic effect disappears at high salt concentrations, above 4.5% NaCl and above about 2% calcium chloride. To emphasize the effects of salt concentrations, the data from Table I have been plotted in Fig. 1, which shows the relationship between filtration rate and the sodium chloride concentration in the aqueous phase of the mud, and Fig. 2, which shows a relationship between filtration rate and the calcium chloride concentration in the aqueous phase of the mud.

It will be seen from an examination of the data presented in Table I and graphically in Figs. 1 and 2 that below about 4.5% NaCl in the aqueous phase of the mud and below about 2% $CaCl_2$ in the aqueous phase of the mud a marked synergistic effect is obtained when using the two additives in the drilling mud.

Figure 2:
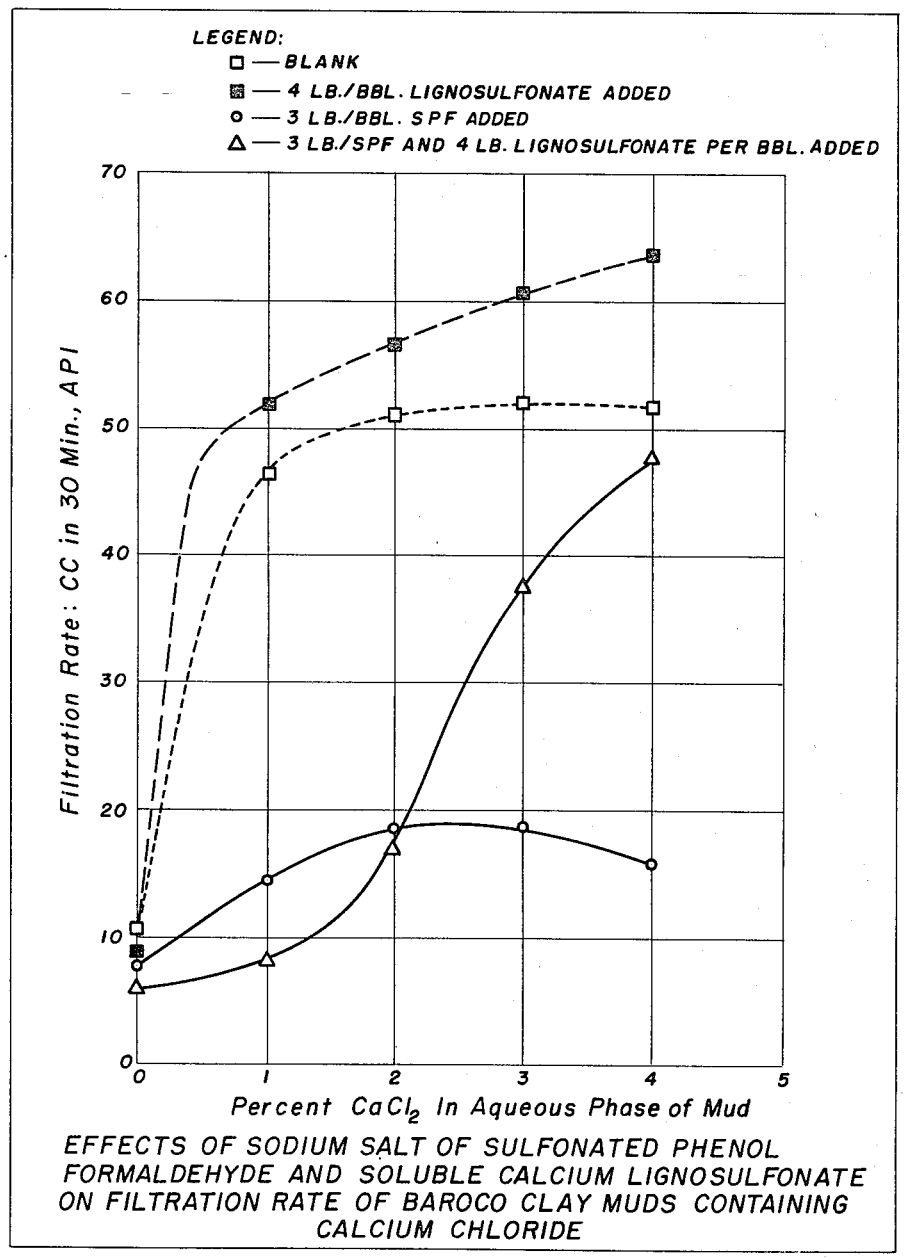

Although the results presented in Figs. 1 and 2 illustrate the synergistic effect obtained over a range of salt concentrations, the data presented in these figures do not show the maximum benefits obtainable. Referring to the data presented in Example 3 of Table I, a filtration reduction from 30 cc. in 30 minutes to 5.5 cc. in 30 minutes resulted from the addition of 4 pounds of the water soluble salt of lignin sulfonic acid to the mud containing 3 pounds per barrel of SPF, while the addition of 4 pounds per barrel of water soluble salt of lignin sulfonic acid alone reduced the filtration rate from 55 cc. to only 48 cc. The synergistic effects are shown further in Examples 9 and 10, where the addition of the lignin sulfonate alone had little or no effect on filtration; the addition of the SPF alone reduced filtration by about half the values shown for the blank samples; but the combination of the two reduced filtration to less than one-fourth the original values.

Since it is almost universal practice to add various chemicals to drilling mud to reduce the viscosity and gel strength thereof, compositions were prepared to determine the effects of several common additives on performance of mud containing the SPF and the water soluble salt of lignin sulfonic acid together. The data presented in Table II illustrate the effects of the two additives on a drilling mud containing caustic quebracho. In this instance the drilling mud was from Lake Raccourci field in Louisiana.

concentrations up to 4 pounds per barrel, the highest concentration employed. Thus the addition of 3 pounds per barrel of SPF reduced the API filtration of the mud from 55.2 cc. to 30 cc. and the addition of 6 pounds per barrel of calcium lignin sulfonate reduced the filtration rate from 55.2 cc. to 47.2 cc. In combination, 3 pounds of SPF and 2 pounds of calcium lignin sulfonate per barrel of mud reduced the filtration rate from 55.2 cc. to 6.6 cc. In all cases, the addition of the caustic-quebracho mixture caused appreciable increases in filtration; thus the addition of 1 pound of caustic-quebracho per barrel of mud increased the filtration from 55.2 cc. to 67 cc. and the addition of 2 pounds of calcium lignin sulfonate per barrel of mud reduced the filtration rate from 67 cc. to 62 cc. The addition of 3 pounds of SPF per barrel of mud containing 1 pound of caustic quebracho per barrel reduced the filtration rate from 67 cc. to 18.1. Addition of 3 pounds of SPF and 3 pounds of calcium lignin sulfonate per barrel of mud which contained 1 pound of caustic-quebracho per barrel reduced the filtration rate from 67 cc. to 6.1 cc.

The mud used in these tests was obtained from Lake Raccourci No. 1, Louisiana State Lease 1449 when drilling at about 6000 feet. The water used in the drilling operation was taken from the lake, the salinity of which at that time was about one-half that of sea water, or in the range of 10,000 to 12,000 parts per million of chloride. The soluble lignin sulfonate was obtained from the Milwhite Co. under the trade name of "Kembreak" and is calcium lignin sulfonate.

In order to show additional effects, other compositions were prepared in which a stock mud had caustic, quebracho, lime, calcium lignin sulfonate and SPF added to it in various combinations and concentrations. These data are presented in Table III.

TABLE II

| Substance Added to Mud, lbs./bbl. | | | Viscosity at 600 R. P. M., Stormer, cps. | Gel Strength, Grams, Stormer | | Low Pressure API Filtration Rate, cc. in 30 min |
|---|---|---|---|---|---|---|
| SPF | Water Soluble[1] Lignosulfonate | 50:50 Caustic-Quebracho | | Initial | 3 Minutes | |
| 0 | 0 | 0 | 6 | 8 | 12 | 55.2 |
| 1 | 0 | 0 | 7 | 8 | ---- | 49.8 |
| 2 | 0 | 0 | 7.7 | 7 | 18 | 38.8 |
| 3 | 0 | 0 | 8 | 5 | ---- | 30.0 |
| 0 | 2 | 0 | 4.7 | 1 | ---- | 52.6 |
| 0 | 4 | 0 | 4.3 | 1 | 4 | 48.0 |
| 0 | 6 | 0 | 4.3 | 1 | ---- | 47.2 |
| 0 | 0 | 1 | 5.0 | 3 | ---- | 67.0 |
| 0 | 0 | 2 | 4.5 | 0 | ---- | 76.0 |
| 0 | 0 | 4 | 4.5 | 0 | 0 | 67.0 |
| 0 | 2 | 1 | 4.0 | 0 | ---- | 62.0 |
| 1 | 4 | 0 | 4.5 | 1 | ---- | 9.3 |
| 2 | 4 | 0 | 5.0 | 2 | ---- | 6.4 |
| 3 | 4 | 0 | 5.3 | 2 | ---- | 5.5 |
| 3 | 2 | 0 | 4.5 | 1 | ---- | 6.6 |
| 3 | 6 | 0 | 5.0 | 1 | ---- | 4.4 |
| 3 | 0 | 1 | 6.3 | 2 | ---- | 18.1 |
| 3 | 0 | 2 | 5.3 | ½ | ---- | 13.1 |
| 3 | 0 | 3 | 5.3 | 0 | ---- | 13.7 |
| 3 | 0 | 4 | 5.7 | 0 | ---- | 14.1 |
| 3 | 3 | 1 | 4.5 | 0 | ---- | 6.1 |
| 3 | 3 | 2 | 5.7 | 0 | ---- | 9.4 |
| 3 | 3 | 3 | 5.3 | 0 | ---- | 7.9 |
| 3 | 3 | 4 | 5.3 | 0 | ---- | 14.1 |

[1] Soluble calcium lignin sulfonate (Kembreak).

The data presented in Table II show the SPF and the calcium lignin sulfonate to be effective in the presence of 50:50 caustic quebracho in

TABLE III

| Materials Added to Stock Mud, lbs./bbl.[1] | | | | | Mud Properties | | |
|---|---|---|---|---|---|---|---|
| Caustic | Quebracho | Lime | Kembreak[2] | SPF | Viscosity, 600 R. P. M., Stormer, cp. | Initial Gel, Stormer, gms. | Filtration Rate, API, cc. |
| 0 | 0 | 0 | 0 | 0 | 9 | 12 | 55.5 |
| 0.5 | 0.5 | 0 | 0 | 0 | 7 | 9 | 66.0 |
| 1 | 1 | 0 | 0 | 0 | 7 | 7 | 74.0 |
| 2 | 2 | 0 | 0 | 0 | 6 | 2 | 96.0 |
| 0 | 0 | 0 | 0 | 3 | 9 | 7 | 18.0 |
| 0 | 0 | 0 | 1 | 3 | 8 | 5 | 11.0 |
| 0 | 0 | 0 | 2 | 3 | 9 | 3 | 8.5 |
| 0 | 0 | 0 | 4 | 3 | 9 | 1 | 6.4 |
| 0 | 0 | 0 | 4 | 1.5 | 9 | 0 | 7.8 |
| 1 | 1 | 0 | 0 | 3 | 9.5 | 2 | 39.5 |
| 1 | 1 | 0 | 1 | 3 | 9 | 0 | 17.8 |
| 1 | 1 | 0 | 2 | 3 | 9 | 0 | 9.8 |
| 1 | 1 | 0 | 4 | 3 | 9 | 0 | 7.6 |
| 1 | 1 | 0 | 4 | 1.5 | 7.5 | 0 | 12.8 |
| 0.25 | 0.25 | 0 | 4 | 3 | 7.5 | 0 | 6.4 |
| 0.5 | 0.5 | 0 | 4 | 3 | 7 | 0 | 5.8 |
| 1 | 2 | 1 | 4 | 3 | 7 | 0 | 6.8 |
| 0.5 | 2 | 1 | 4 | 3 | 8 | 0 | 4.8 |
| 1 | 3 | 2 | 4 | 3 | 6 | 0 | 6.8 |

[1] Mud prepared from shale from West Cote Blanche Bay 2, St. Lse. 1704, Lake Sand field, La., 4,800 ft. 3,600 gms. shale mixed into 8,400 gms. sea water. The mud was stirred 3 days.
[2] Soluble calcium lignin sulfonate.

The data presented in Table III were obtained with a sea-water mud prepared from shale obtained at a 4800 foot level from a well in the Lake Sand Field in Louisiana as identified in Table III. As shown in Table III, 2 pounds per barrel of the caustic-quebracho increased the filtration rate of the sea-water mud prepared from shale from 55.5 cc. in 30 minutes to 74 cc. in 30 minutes. The addition of 3 pounds per barrel of SPF reduced the filtration of the caustic and the quebracho treated mud to 39.5 cc. The addition of 3 pounds per barrel of SPF plus 4 pounds of the calcium lignin sulfonate per barrel of mud reduced the filtration rate to 7.6 cc. in 30 minutes. These results also show that contamination with lime in concentrations up to 2 pounds per barrel of mud did not affect adversely the filtration rate of the treated mud.

It is contemplated in the practice of the present invention that the invention will have particular application where mud is apt to be contaminated with either cement, lime, gypsum, and anhydrite or salt water. Thus my invention can be used to assure a stable low filtration rate mud. When fresh waters are employed in the mud they may damage a producing formation. Where there is danger of such damage it may be advantageous to add salt to the drilling mud along with the two water soluble salts referred to supra.

In the practice of the present invention, it may be desirable to add salt, lime, caustic quebracho and the like to the mud used in drilling, in addition to the SPF and lignin sulfonates. By practicing my invention employing the improved composition, a desirable filter cake is built up on the walls of the well bore which greatly reduces the water loss from the mud to permeable formations penetrated by the drill bit.

While I have mentioned water soluble salts of the sulfonated phenol-formaldehyde condensation product and the water soluble salts of lignin sulfonic acid, I prefer to use the sodium salt of the sulfonated phenol-formaldehyde condensation product and the calcium salt of lignin sulfonic acid. However, I may use a sodium salt of lignin sulfonic acid in combination with the sodium salt of the sulfonated phenol-formaldehyde condensation product. Other alkali and alkaline earth salts may be used besides those mentioned; for example, I may wish to use potassium or lithium salts of the sulfonated phenol-formaldehyde condensation product. Also I may use the other alkaline earth metal salts of the lignin sulfonic acid, such as magnesium, strontium, barium and the like, or I may use the other alkali metal salts of lignin sulfonic acid besides sodium, such as lithium and potassium.

Likewise, the invention has been described with reference to using water containing sodium and calcium chloride. I contemplate using water containing salts of other alkali and alkaline earth metals such as those contained in sea water. Specifically I contemplate using waters containing the chlorides of sodium, calcium, lithium, potassium, magnesium, beryllium, strontium, barium and the sulfates of these ions where they are soluble. Many of these salts are found in sea water.

The invention has been described and claimed with respect to employing waters the salinity of which may vary from no salt to a salt content considerably greater than that of sea water. I prefer, however, to use a water having a salinity no greater than 2% when due to calcium chloride and a salinity no greater than 4.5% when due to sodium chloride. The waters preferably used in my invention have a salinity in the range from 0.5 to 4.5%.

The nature and objects of the present invention having been completely described and illustrated, what I wish to claim as new and useful and to secure by Letters Patent is:

1. A drilling mud comprising a water soluble salt of lignin sulfonic acid in an amount in the range between 0.5 and 20.0 pounds per 42 gallon barrel of said mud, a water soluble salt of a sulfonated phenol formaldehyde condensation product in an amount in the range between 0.5 and 10 pounds per 42 gallon barrel of said mud, at least 5% by weight of finely divided solid material, and water containing no more than 4.5% by weight of alkali metal chloride and no more than 2% by weight of an alkaline earth metal chloride, the total salinity of said water being in the range from 0.5% to 4.5%.

2. A drilling mud comprising at least 5% by weight of finely divided solids and water containing no more than 4.5% by weight sodium chloride and no more than 2% by weight calcium chloride to which has been added calcium lignin sulfonate in an amount in the range between 0.5 and 20.0 pounds per 42 gallon barrel of said mud and a water soluble sodium salt of a phenol-formaldehyde condensation product in an amount in the range between 0.5 and 10 pounds per 42 gallon barrel of said mud, said water having a total salinity in the range between 0.5% and 4.5%.

3. A drilling mud comprising at least 5% by weight of finely divided solids and sea water, a water soluble salt of lignin sulfonic acid in an amount in the range between 0.5 and 20.0 pounds per 42 gallon barrel of said mud and a water soluble salt of a sulfonated phenol formaldehyde condensation product in an amount in the range between 0.5 and 10.0 pounds per 42 gallon barrel of said mud.

4. A drilling mud comprising at least 5% by weight of finely divided solids and water having a total salinity in the range from 0.5% to 4.5%, a water soluble salt of lignin sulfonic acid in an amount in the range between 0.5 and 20.0 pounds per 42 gallon barrel of said mud and a water soluble salt of a sulfonated phenol formaldehyde condensation product in an amount in the range between 0.5 and 10.0 pounds per 42 gallon barrel of said mud.

5. A method of treating a suspension of finely divided solid material in an aqueous liquid vehicle having a total salinity in the range between 0.5% and 4.5% by weight which comprises adding to said suspension synergistic amounts of a water soluble salt of lignin sulfonic acid in the range between 0.5 and 20 pounds per 42 gallon barrel of said suspension and a water soluble salt of a phenol-formaldehyde condensation product in the range between 0.5 and 10 pounds per 42 gallon barrel of said suspension sufficient to lower the filtration rate of said suspension.

6. A method of preparing a drilling mud which comprises adding to an aqueous suspension in a liquid vehicle having a total salinity in the range between 0.5 and 4.5% by weight containing at least 5% by weight of finely divided solid materials an amount in the range between 0.5 and 20 pounds per 42 gallon barrel of said mud of a water soluble salt of lignin sulfonic acid and an amount in the range between 0.5 and 10 pounds per 42 gallon barrel of said mud of a water soluble salt of a sulfonated phenol-formaldehyde condensation product to reduce the tendency of said drilling mud to lose water when used in a borehole traversing a permeable formation.

7. A method in accordance with claim 6 in which the water soluble salt of lignin sulfonic acid is a calcium salt and the water soluble salt of the sulfonated phenol-formaldehyde condensation product is a sodium salt.

8. In a process for drilling a well with well drilling tools in which there is circulated in the well a water base drilling mud containing at least 5% by weight of finely divided solid material, said water base having a total salinity in the range between 0.5% and 4.5% by weight, the method of forming a filter cake on a wall of the said well to decrease loss of water into a permeable formation penetrated by said well which comprises admixing with said drilling mud synergistic amounts of a water soluble salt of lignin sulfonic acid in the range between 0.5 and 20 pounds per 42 gallon barrel of said drilling mud and a water soluble salt of a sulfonated phenol-formaldehyde condensation product in the range between 0.5 and 10 pounds per 42 gallon barrel of said drilling mud sufficient to lower the filtration rate of said mud.

9. A method in accordance with claim 8 in which the water base is sea water.

10. A method in accordance with claim 8 in which the water soluble salt of the lignin sulfonic acid is a calcium salt and the water soluble salt of the sulfonated phenol-formaldehyde condensation product is a sodium salt.

RICHARD A. SALATHIEL.

References Cited in the file of this patent

UNITED STATES PATENTS

| Number | Name | Date |
|---|---|---|
| 2,331,281 | Wayne | Oct. 12, 1943 |
| 2,404,038 | Cardwell | July 16, 1946 |
| 2,479,061 | Denton | Aug. 16, 1949 |
| 2,491,436 | Barnes | Dec. 13, 1949 |
| 2,491,437 | Perkins | Dec. 13, 1949 |
| 2,560,380 | Wrightsman | July 10, 1951 |